United States Patent
Kim et al.

(10) Patent No.: US 10,321,472 B2
(45) Date of Patent: Jun. 11, 2019

(54) UPLINK MULTI-USER TRANSMISSION METHOD IN WIRELESS LAN SYSTEM AND APPARATUS THEREFOR

(71) Applicant: LG ELECTRONICS INC., Seoul (KR)

(72) Inventors: Jeongki Kim, Seoul (KR); Kiseon Ryu, Seoul (KR); Giwon Park, Seoul (KR); Suhwook Kim, Seoul (KR); Hangyu Cho, Seoul (KR)

(73) Assignee: LG ELECTRONICS INC., Seoul (KR)

(*) Notice: Subject to any disclaimer, the term of this patent is extended or adjusted under 35 U.S.C. 154(b) by 63 days.

(21) Appl. No.: 15/310,734

(22) PCT Filed: Jun. 8, 2015

(86) PCT No.: PCT/KR2015/005715
§ 371 (c)(1),
(2) Date: Nov. 11, 2016

(87) PCT Pub. No.: WO2015/190779
PCT Pub. Date: Dec. 17, 2015

(65) Prior Publication Data
US 2017/0086212 A1 Mar. 23, 2017

Related U.S. Application Data

(60) Provisional application No. 62/009,319, filed on Jun. 8, 2014, provisional application No. 62/014,669, filed on Jun. 19, 2014.

(51) Int. Cl.
*H04L 1/16* (2006.01)
*H04L 1/18* (2006.01)
(Continued)

(52) U.S. Cl.
CPC .......... *H04W 72/12* (2013.01); *H04L 1/1664* (2013.01); *H04L 1/1887* (2013.01);
(Continued)

(58) Field of Classification Search
CPC . H04W 72/12; H04W 72/1268; H04W 72/04; H04W 84/12; H04W 88/08;
(Continued)

(56) References Cited

U.S. PATENT DOCUMENTS

2011/0119288 A1   5/2011  Sinha
2011/0134816 A1   6/2011  Lie et al.
(Continued)

FOREIGN PATENT DOCUMENTS

CN   102256368   11/2011
CN   102763388   10/2012
(Continued)

OTHER PUBLICATIONS

PCT International Application No. PCT/KR2015/005715, Written Opinion of the International Searching Authority dated Sep. 25, 2015, 24 pages.
(Continued)

*Primary Examiner* — Ian N Moore
*Assistant Examiner* — Brian T Le
(74) *Attorney, Agent, or Firm* — Lee Hong Degerman Kang Waimey

(57) ABSTRACT

The present document relates to a method for efficiently performing uplink multi-user transmission in a wireless LAN system and an apparatus therefor. To this end, an access point (AP) may transmit a downlink multi-user frame to a plurality of STAs, receive an uplink frame including an acknowledgement/non-acknowledgement (ACK/NACK) signal for the downlink multi-user frame and an uplink scheduling request signal from at least two STAs among the
(Continued)

STAs, transmit a downlink frame including uplink scheduling information to the at least two STAs on the basis of the uplink scheduling request signal, and receive an uplink multi-user frame including data from the at least two STAs in response thereto. Here, an SIG field of the downlink frame preferably comprises an indicator indicating that the downlink frame includes uplink multi-user scheduling information.

10 Claims, 13 Drawing Sheets

(51) Int. Cl.
| | |
|---|---|
| *H04L 5/00* | (2006.01) |
| *H04L 27/26* | (2006.01) |
| *H04W 72/04* | (2009.01) |
| *H04W 72/12* | (2009.01) |
| *H04W 84/12* | (2009.01) |
| *H04W 88/08* | (2009.01) |

(52) U.S. Cl.
CPC .......... *H04L 5/0044* (2013.01); *H04L 5/0058* (2013.01); *H04L 5/0092* (2013.01); *H04W 72/04* (2013.01); *H04W 72/1268* (2013.01); *H04L 5/0007* (2013.01); *H04L 5/0053* (2013.01); *H04L 5/0055* (2013.01); *H04L 27/2601* (2013.01); *H04W 84/12* (2013.01); *H04W 88/08* (2013.01)

(58) Field of Classification Search
CPC ........... H04W 72/121; H04W 72/1289; H04W 72/1284; H04W 72/1278; H04W 72/1205; H04L 5/0044; H04L 5/0058; H04L 5/0092; H04L 5/0007; H04L 5/0053; H04L 5/0055; H04L 27/26; H04L 27/2601
See application file for complete search history.

(56) References Cited

U.S. PATENT DOCUMENTS

| | | | | |
|---|---|---|---|---|
| 2013/0250766 | A1* | 9/2013 | Chaudhuri | H04W 72/1242 370/235 |
| 2013/0301551 | A1 | 11/2013 | Ghosh et al. | |

FOREIGN PATENT DOCUMENTS

| | | |
|---|---|---|
| CN | 103384190 | 11/2013 |
| EP | 3193473 | 7/2017 |
| JP | 2006197045 | 7/2006 |
| JP | 2012519427 | 8/2012 |
| JP | 2013514010 | 4/2013 |
| KR | 1020110007977 | 1/2011 |
| KR | 1020110103357 | 9/2011 |
| KR | 1020140055944 | 5/2014 |
| RU | 2355111 | 9/2008 |
| WO | 2011102575 | 8/2011 |

OTHER PUBLICATIONS

European Patent Office Application Serial No. 15806676.1, Search Report dated Feb. 7, 2018, 14 pages.
Russian Federation Federal Service for Intellectual Property, Patents and Trademarks Application Serial No. 2016149312/07, Office Action dated Feb. 21, 2018, 12 pages.
LV, K. et al., "Frame Exchange Control for Uplink Multi-user transmission", doc.: IEEE 802.11-14/1190r0, XP068071003, Sep. 2014, 14 pages.
Chun, J. et al., "Uplink multi-user transmission", doc.: IEEE 11-13/1388r0, XP068063405, Nov. 2013, 18 pages.
IP Australia Application Serial No. 2015272286, Office Action dated Nov. 14, 2017, 6 pages.
Nguyen, T. et al., "Uplink multi-user MAC protocol for 11ax," Kyushu Institute of Technology, doc.: IEEE 11-14/0598r0, May 2014, 19 pages.
Liao, R. et al., "DCF/USDMA: Enhanced DCF for Uplink SDMA Transmissions in WLANs," Universitat Pompeu Fabra, Aug. 2012, 6 pages.
Canadian Intellectual Property Office Application No. 2,951,524, Office Action dated Oct. 4, 2018, 8 pages.
The State Intellectual Property Office of the People's Republic of China Application Serial No. 201580030624.0, Office Action dated Nov. 27, 2018, 5 pages.
Nguyen, et al., "Uplink multi-user MAC protocol for 11ax", IEEE 11-14/0598r0, May 11, 2014, 17 pages.

\* cited by examiner

UPLINK MULTI-USER TRANSMISSION METHOD IN WIRELESS LAN SYSTEM AND APPARATUS THEREFOR

CROSS-REFERENCE TO RELATED APPLICATIONS

This application is the National Stage filing under 35 U.S.C. 371 of International Application No. PCT/KR2015/005715, filed on Jun. 8, 2015, which claims the benefit of U.S. Provisional Application No. 62/009,319, filed on Jun. 8, 2014 and 62/014,669, filed Jun. 19, 2014, the contents of which are all hereby incorporated by reference herein in their entirety.

TECHNICAL FIELD

The following description relates to a method of efficiently performing uplink multi-user transmission in a wireless local area network (WLAN) and an apparatus therefor.

BACKGROUND ART

Standards for the WLAN technology have been developed as Institute of Electrical and Electronics Engineers (IEEE) 802.11 standards. IEEE 802.11a and b use an unlicensed band at 2.4 GHz or 5 GHz. IEEE 802.11b provides a transmission rate of 11 Mbps and IEEE 802.11a provides a transmission rate of 54 Mbps. IEEE 802.11g provides a transmission rate of 54 Mbps by applying Orthogonal Frequency Division Multiplexing (OFDM) at 2.4 GHz. IEEE 802.11n provides a transmission rate of 300 Mbps for four spatial streams by applying Multiple Input Multiple Output (MIMO)-OFDM. IEEE 802.11n supports a channel bandwidth of up to 40 MHz and, in this case, provides a transmission rate of 600 Mbps.

Since the above-described standards for the WLAN technology maximally use bandwidth of 160 MHz and support eight spatial streams, IEEE 802.11ax standardization is being discussed in addition to IEEE 802.11ac standard maximally supporting a rate of 1 Gbit/s.

In the WLAN standardization process, a method of, at a non-AP station (STA), receiving a signal from an access point (AP) STA using a multi-user beamforming method was introduced in IEEE 802.11ac. However, technology of applying multi-user scheduling to transmission from a non-AP STA to an AP in addition to data transmitted to the non-AP STA has been required.

DISCLOSURE

Technical Problem

As described above, the present invention proposes an efficient multi-user transmission method from a non-AP STA to an AP in a WLAN system.

Although downlink/uplink has been not applied to a WLAN system unlike a cellular wireless communication system up to now, a link from an AP to a non-AP STA is defined as a downlink and a link from a non-AP STA to an AP is defined as an uplink in the present invention.

In the following description, a method of efficiently performing uplink multi-user transmission as well as downlink multi-user transmission in a WLAN system is provided.

Technical Solution

The object of the present invention can be achieved by providing a method of, at an access point (AP), receiving data from a plurality of stations (STAs) in a wireless local area network (WLAN) including transmitting a downlink multi-user frame to the plurality of STAs, receiving uplink frames each including an acknowledgement (ACK)/negative-acknowledgement (NACK) signal for the downlink multi-user frame and an uplink scheduling request signal from two or more of the STAs, transmitting a downlink frame including uplink scheduling information to the two or more STAs based on the uplink scheduling request signal, and receiving the uplink multi-user frame including the data from the two or more STAs, wherein an SIG field of the downlink frame includes a first indicator indicating that the downlink frame includes the uplink multi-user scheduling information.

If the downlink frame includes the uplink multi-user scheduling information, a GID and partial AID of the downlink frame may have a combination of specific values. In contrast, if the downlink frame includes the uplink multi-user scheduling information, the SIG field of the downlink field may include a specific bit indicating that the downlink frame indicates a frame for transmitting the uplink multi-user scheduling information.

If the downlink frame includes the uplink multi-user scheduling information, the downlink frame may includes one ID field for identifying the AP, a plurality of STA ID fields for identifying the two or more STAs, resource allocation fields for respectively allocating uplink resources to the two or more STAs, and control fields for an uplink data transmission scheme for each of the two or more STAs.

At this time, the uplink multi-user frame may be received when a predetermined time elapses after receiving the downlink frame including the uplink scheduling information.

In addition, after receiving the uplink frame including the uplink scheduling request signal, the AP may transmit an additional downlink frame including transmission start time information of the downlink frame including the ACK/NACK signal for the uplink signal and the uplink scheduling information, and the downlink frame including the uplink scheduling information may b transmitted at a time corresponding to the start time information.

In addition, the downlink multi-user frame may include a second indicator indicating triggering of transmission of the uplink scheduling request signal to the plurality of STAs, and, if the second indicator indicates that transmission of the uplink scheduling request signal is triggered, the uplink frame including the uplink scheduling request signal may be received from the plurality of STAs.

In addition, the uplink multi-user frame may further include the ACK/NACK signal for the downlink frame including the uplink scheduling information and a subsequent uplink scheduling request signal, and the AP may include a subsequent uplink scheduling information in a downlink multi-user frame subsequently transmitted in correspondence with the subsequent uplink scheduling request signal.

In addition, the downlink frame including the uplink scheduling information may have a null subframe included in a predetermined number of last subframes.

The AP may transmit a delay notification frame when a predetermined time elapses after transmitting the downlink frame including the uplink scheduling information, and receive the uplink multi-user frame from the two or more STAs when the predetermined time elapses after transmitting the delay notification frame. At this time, the downlink frame including the uplink scheduling information may further include a third indicator indicating whether the delay notification frame is present.

In another aspect of the present invention, provided herein is a method of, at a station (STA), transmitting data to an access point (AP) in a wireless local area network (WLAN) including receiving a downlink multi-user frame from the AP, transmitting an uplink frame including an acknowledgement (ACK)/negative-acknowledgement (NACK) signal for the downlink multi-user frame and an uplink scheduling request signal to the AP, receiving a downlink frame including uplink scheduling information from the AP, and transmitting an uplink multi-user frame including the data in correspondence with the uplink scheduling information, wherein an SIG field of the downlink frame includes a first indicator indicating that the downlink frame includes the uplink multi-user scheduling information.

In another aspect of the present invention, provided herein is an access point (AP) device configured to receive data from a plurality of stations (STAs) in a wireless local area network (WLAN) including a transceiver configured to transmit and receive a downlink multi-user frame and an uplink multi-user frame to and from the plurality of STAs and a processor connected to the transceiver and configured to control operation of the transceiver, wherein the processor configured to, if uplink frames each including an acknowledgement (ACK)/negative-acknowledgement (NACK) signal for the downlink multi-user frame and an uplink scheduling request signal are received from two or more of the STAs, transmit a downlink frame including uplink scheduling information to the two or more STAs based on the uplink scheduling request signal, and wherein an SIG field of the downlink frame includes a first indicator indicating that the downlink frame includes the uplink multi-user scheduling information.

In another aspect of the present invention, provided herein is a station (STA) device configured to transmit data to an access point (AP) in a wireless local area network (WLAN) including a transceiver configured to receive a downlink multi-user frame from the AP and to transmit an uplink multi-user frame to the AP and a processor connected to the transceiver and configured to control operation of the transceiver, wherein the processor configured to transmit an uplink frame including an acknowledgement (ACK)/negative-acknowledgement (NACK) signal for the downlink multi-user frame and an uplink scheduling request signal to the AP if a downlink multi-user frame is received from the AP and transmit the uplink multi-user frame including the data in correspondence with the uplink scheduling information if a downlink frame including uplink scheduling information is received from the AP, and wherein an SIG field of the downlink frame includes a first indicator indicating that the downlink frame includes the uplink multi-user scheduling information.

Advantageous Effects

According to the present invention, it is possible to efficiently implement an uplink multi-user transmission method in a WLAN system while minimizing signaling overhead.

BEST MODE

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form.

As described above, the following description relates to a method of efficiently performing uplink multi-user transmission in a wireless local area network (WLAN) and an apparatus therefor. First, a WLAN system, to which the present invention is applied, will be described in detail.

Figure 1:
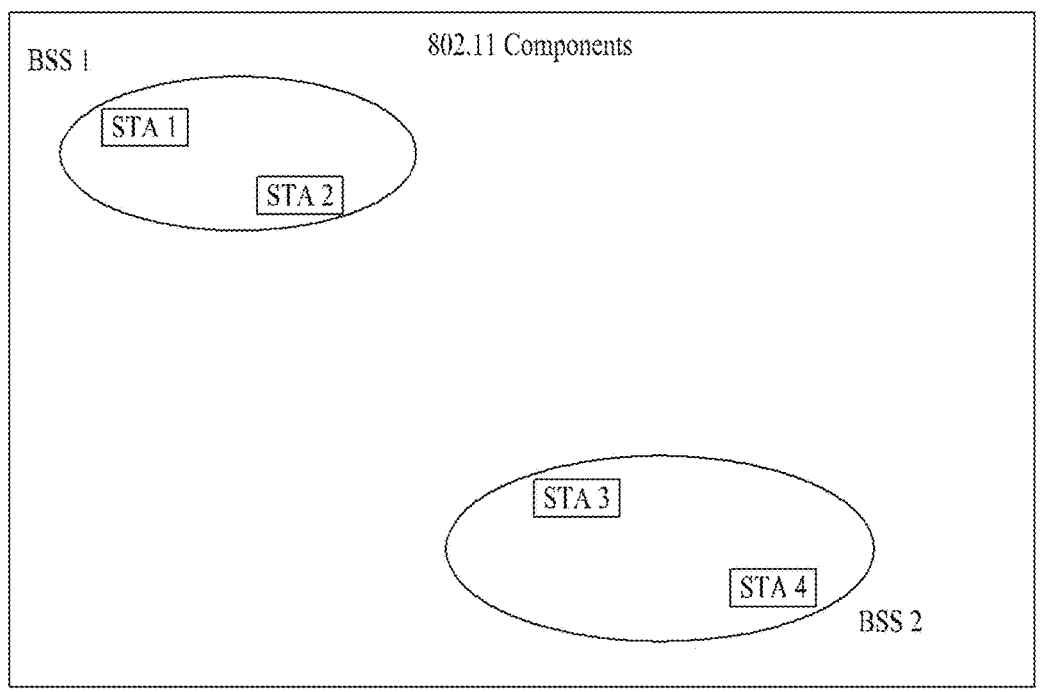
FIG. 1 is a diagram illustrating an exemplary configuration of a Wireless Local Area Network (WLAN) system.

FIG. 1 is a diagram illustrating an exemplary configuration of a WLAN system.

As illustrated in FIG. 1, the WLAN system includes at least one Basic Service Set (BSS). The BSS is a set of STAs that are able to communicate with each other by successfully performing synchronization.

An STA is a logical entity including a physical layer interface between a Media Access Control (MAC) layer and a wireless medium. The STA may include an AP and a non-AP STA. Among STAs, a portable terminal manipulated by a user is the non-AP STA. If a terminal is simply called an STA, the STA refers to the non-AP STA. The non-AP STA may also be referred to as a terminal, a Wireless Transmit/Receive Unit (WTRU), a User Equipment (UE), a Mobile Station (MS), a mobile terminal, or a mobile subscriber unit.

The AP is an entity that provides access to a Distribution System (DS) to an associated STA through a wireless medium. The AP may also be referred to as a centralized controller, a Base Station (BS), a Node-B, a Base Transceiver System (BTS), or a site controller.

The BSS may be divided into an infrastructure BSS and an Independent BSS (IBSS).

The BSS illustrated in FIG. 1 is the IBSS. The IBSS refers to a BSS that does not include an AP. Since the IBSS does not include the AP, the IBSS is not allowed to access to the DS and thus forms a self-contained network.

Figure 2:
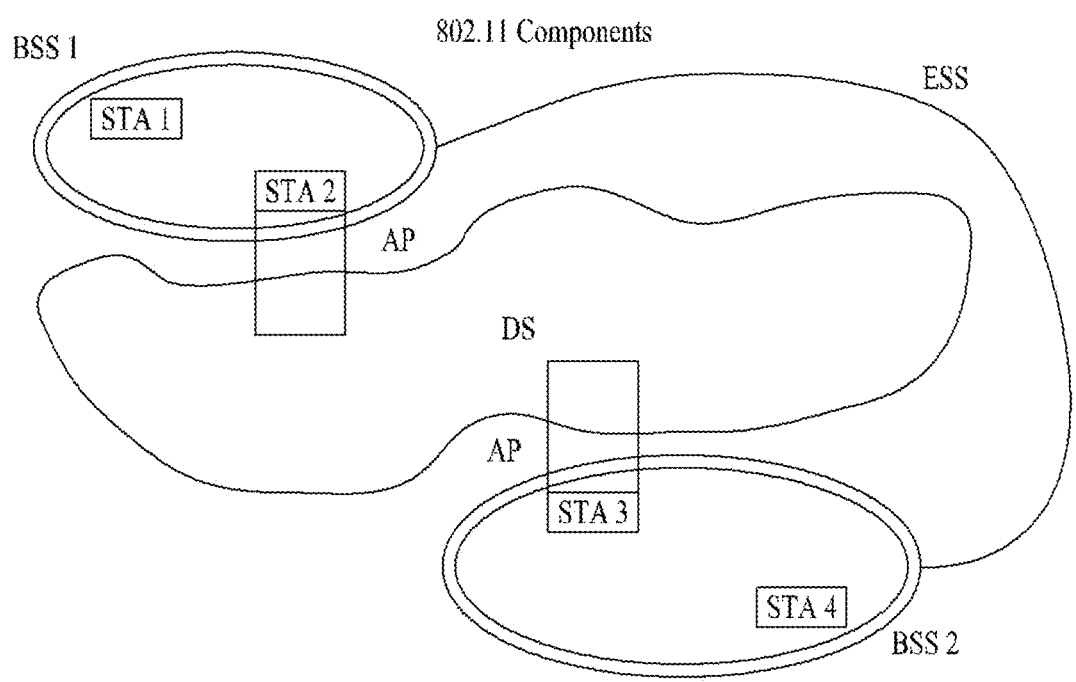
FIG. 2 is a diagram illustrating another exemplary configuration of a WLAN system.

FIG. 2 is a diagram illustrating another exemplary configuration of a WLAN system.

BSSs illustrated in FIG. 2 are infrastructure BSSs. Each infrastructure BSS includes one or more STAs and one or more APs. In the infrastructure BSS, communication between non-AP STAs is basically conducted via an AP. However, if a direct link is established between the non-AP STAs, direct communication between the non-AP STAs may be performed.

As illustrated in FIG. 2, the multiple infrastructure BSSs may be interconnected via a DS. The BSSs interconnected via the DS are called an Extended Service Set (ESS). STAs included in the ESS may communicate with each other and a non-AP STA within the same ESS may move from one BSS to another BSS while seamlessly performing communication.

The DS is a mechanism that connects a plurality of APs to one another. The DS is not necessarily a network. As long as it provides a distribution service, the DS is not limited to any specific form. For example, the DS may be a wireless network such as a mesh network or may be a physical structure that connects APs to one another.

A multi-user transmission method in a WLAN system according to the present invention will be described based on the above description.

As described above, in the following description, "downlink (DL)" indicates a link from an AP to an STA and "uplink (UL)" indicates a link from an STA to an AP. An "uplink scheduling request signal" refers to a signal for requesting resources used to transmit data from an STA to an AP and may be a bandwidth request (BW-REQ) or a buffer status report (BSR). Hereinafter, assume that a BSR is used as an "uplink scheduling request signal" unless otherwise stated.

Assume that the BSR is a frame used for an STA to notify an AP of a buffer status thereof (e.g., queue size, access category, etc.).

In addition, multi-user transmission is referred to as "MU-Tx".

If DL MU Tx is applied to a WLAN system, an AP may simultaneously transmit data to a plurality of users (STAs) through the same channel/subchannel or different channels/subchannels. Similarly, if UL MU Tx is applied, a plurality of STAs may simultaneously transmit data to an AP through the same channel/subchannel or different channels/subchannels.

To this end, STAs may implicitly (e.g., based on SIFS) or explicitly confirm (e.g., through UL MU scheduling) a transmission start time when the STAs simultaneously transmit data. In addition, the STAs may report buffer statuses thereof to the AP in order to prevent unnecessary resource waste.

In a WLAN system, additional resource overhead and procedures are required for appropriate MU Tx, thereby leading to an inefficient MU Tx method. To this end, in the following description, an MU Tx method which may be efficiently performed while minimizing resource overhead is proposed.

In an aspect of the present invention, if an AP receives a BSR from STAs, the AP may be configured to transmit a UL MU scheduling frame (DL frame including UL MU scheduling information) to the plurality of STAs in consideration of the BSR. If each STA receives a triggering frame such as a UL MU scheduling frame and an address thereof (e.g., AID/PAID, etc.) is included in the frame, each STA may transmit a UL frame to the AP at a given time. Here, the given time may be a time (e.g., SIFS/PIFS) fixed after receiving a UL MU scheduling frame or a time indicated in a UL MU scheduling frame. If a UL MU frame is configured to be transmitted at a fixed time, since UL MU frame transmission start time does not need to be indicated in the UL MU scheduling frame, it is possible to reduce signaling overhead.

The AP, which has received the UL MU frames from the STAs, may transmit an acknowledgement (ACK) frame to the STAs after successfully receiving the UL MU frame.

Figure 3:
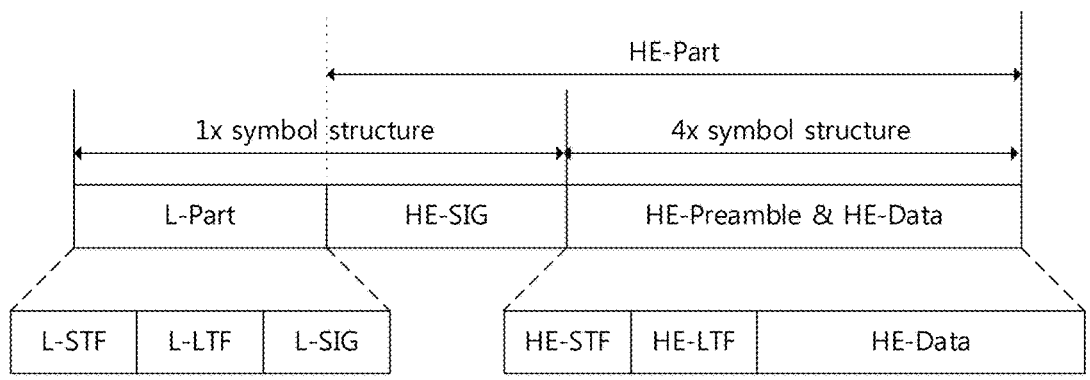
FIG. 3 is a diagram showing an example of a frame format which may be used in a new standard, to which the present invention will be applied.

FIG. 3 is a diagram showing an example of a frame format which may be used in a new standard, to which the present invention will be applied.

In FIG. 3, "L-part" indicates a frame part for a legacy UE (frame part for a first type UE) and "HE-Part" indicates a frame part for a UE according to improved standard technology (frame part for a second type UE). The frame part according to the new standard may have a length which is an integer multiple of the length of the frame part for the legacy UE. In the example of FIG. 3, in 802.11ax, a frame structure, in which an existing 1x symbol structure (that is, 3.2 μs) is maintained up to HE-SIG and a HE-preamble and data part has a 4x symbol structure (that is, 12.8 μs), is shown.

The format shown in FIG. 3 is exemplary and the symbol length of the HE-preamble part may be differently defined. For example, as another embodiment of the present invention, the HE-preamble selectively may use 1x or 2x symbols and HE-LTF may selectively use any one of 2x or 4x symbols.

In the example of FIG. 3, "L-part" may follow the configuration of L-STF, L-LTF and L-SIG as the configuration maintained in the legacy Wi-Fi system.

HE-SIG of a newly defined HE-part may have fields indicating common control information and user-specific information.

Figure 4:
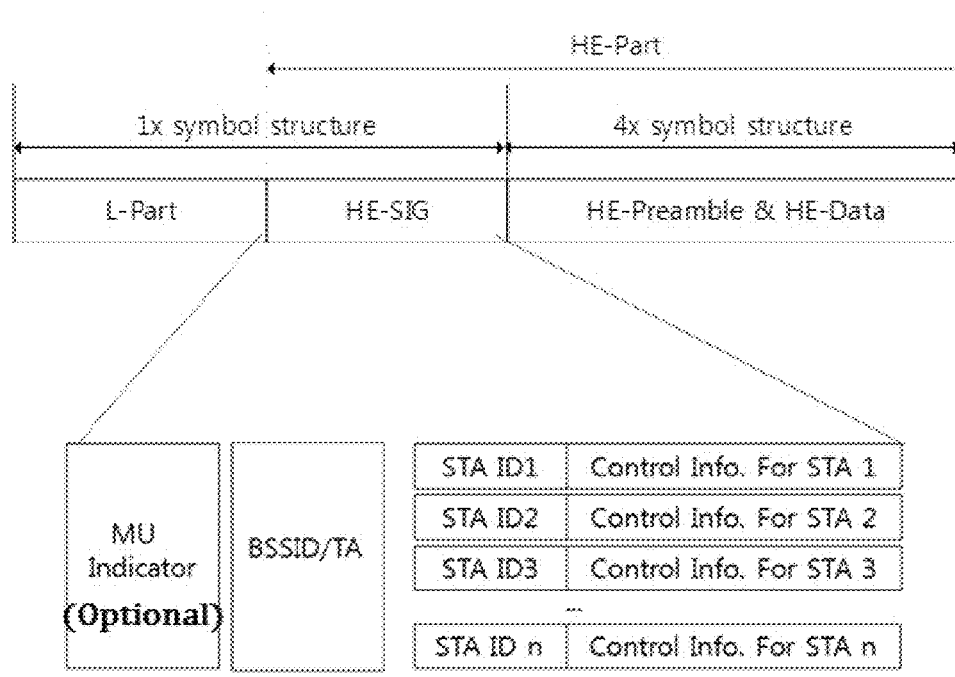
FIG. 4 is a diagram showing an example of a format of a UL MU scheduling frame according to an embodiment of the present invention.

FIG. 4 is a diagram showing an example of a format of a UL MU scheduling frame according to an embodiment of the present invention.

As shown in FIG. 4, in the UL MU scheduling frame, a field indicating BSSID or TA as identification information of an AP, to which a plurality of STAs is connected, and control information fields for UL Tx of the STAs are included in an HE-SIG field.

BSSID is the identifier of a BSS including the STAs and TA indicates the identifier of an STA (that is, the identifier of an AP, in this example), which has transmitted the frame. As shown in FIG. 4, BSSID/TA is common information in MU Tx, but identifier and the control information of the STAs for MU Tx correspond to the user-specific information and include a plurality of information fields.

As the identifiers of the STAs, one of the AID, partial AID and MAC address of each STA may be included. In addition, as control information for UL MU Tx of the STAs, OFDMA channel number (that is, channel allocation information), MU MIMO information such as the number of streams, MCS, a scheduling time (e.g., transmission start time or transmission duration) may be included. In one embodiment of the present invention, if a UL MU frame is configured to be transmitted after a fixed time after transmitting a UL MU scheduling frame, the scheduling time field of the control field may include only the transmission duration information.

As shown in FIG. 4, the UL MU scheduling frame further includes an indicator indicating whether the frame is a UL MU scheduling frame. Although it is assumed that such a field is indicated by separate bits in FIG. 4, the same information may be indicated using an implicit method. For example, the UL MU scheduling frame may be indicated using a specific combination of the GID and partial AID of the SIG field (e.g., GID=63 and partial AID=0). Alternatively, if a frame type field is included, one type indicates a UL MU scheduling frame (trigger frame).

As described above, HE-SIG may be configured to include HE-SIG A for delivering common control information and HE-SIG B for delivering per-user control information. In this case, as shown in FIG. 4, in the UL MU scheduling frame, the MU indicator field and the BSSID/TA field may be included in HE-SIG A and the control information fields for the STAs may be included in HE-SIG B. If the BSSID/TA field is not compressed, the BSSID/TA field may be transmitted in HE-SIG B as a part for delivering common information.

Figure 5:
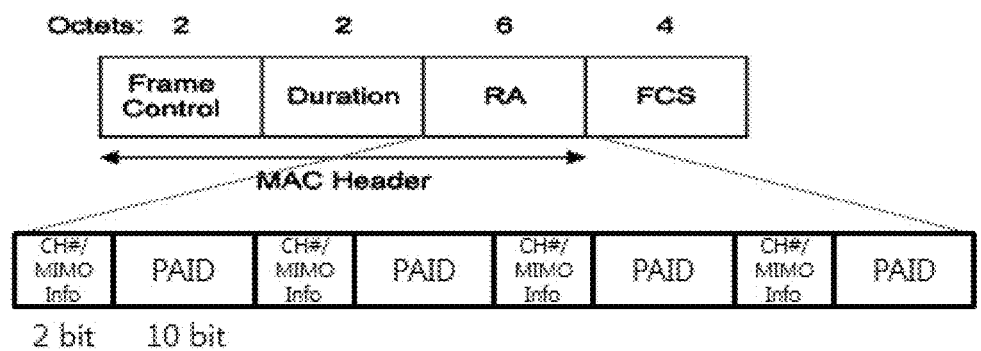
FIG. 5 is a diagram showing an example of changing an existing CTS frame and configuring a UL MU scheduling frame according to another embodiment of the present invention.

FIG. 5 is a diagram showing an example of changing an existing CTS frame and configuring a UL MU scheduling frame according to another embodiment of the present invention.

The CTS frame is a response frame of an RTS frame and may include a frame control field, a duration field, an RA field and an FCS field as shown in FIG. 5. If the existing CTS frame is improved and is used for the UL MU scheduling frame according to the present embodiment, the RA field may include an ID (e.g., PAID) field for the plurality of STAs and control information fields (e.g., channel number/MIMO information, etc.) for each STA.

Although FIG. 5 shows the case where UL Tx scheduling is performed with respect to four STAs, the number of STAs is not limited thereto. In addition, the lengths of the information fields are also exemplary.

An STA, which has received the UL MU scheduling frame shown in FIGS. 4 and 5, may transmit a UL frame through an allocated OFDMA/MU MIMO channel, when an ID thereof is included in the UL MU scheduling frame.

Hereinafter, various embodiments of detailed operations of the STA and the AP using the UL MU scheduling frame will be described.

Figure 6:
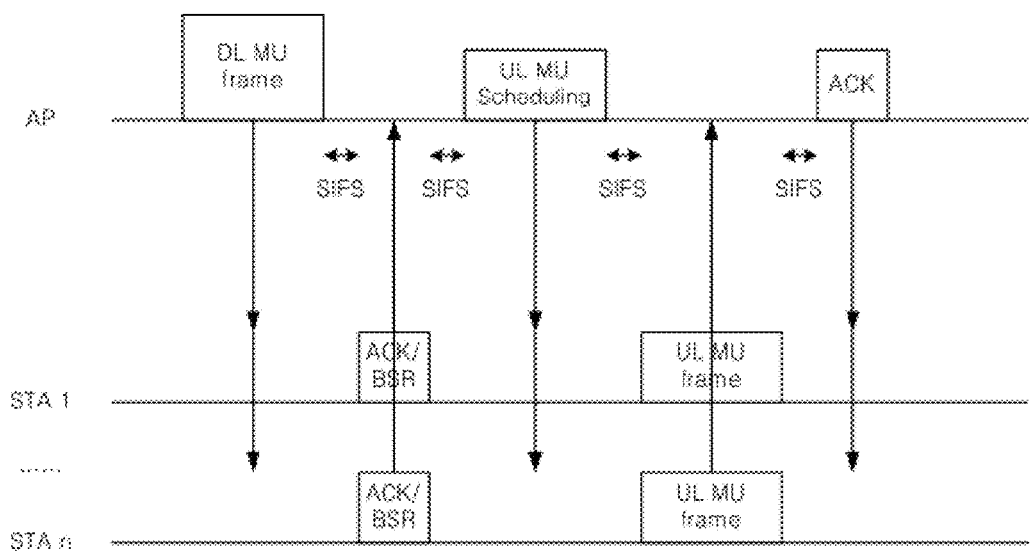
FIG. 6 is a diagram illustrating a method of, at an AP, performing UL MU scheduling with respect to a plurality of STAs according to an embodiment of the present invention.

FIG. 6 is a diagram illustrating a method of, at an AP, performing UL MU scheduling with respect to a plurality of STAs according to an embodiment of the present invention.

As shown in FIG. 6, first, the AP may first transmit a DL MU frame to a plurality of STAs (STA 1, . . . , STA n). The STAs, which have received the DL MU frame, may transmit UL frames each including a BSR along with an ACK signal for the received DL MU frame after a predetermined time (e.g., SIFS). That is, in the present embodiment, each STA may transmit the BSR at a point of time when the ACK may be transmitted, without performing a separate contention process in order to transmit the BSR, thereby preventing unnecessary delay.

As described above, the AP, which has received the UL frame including the BSR, may transmit the UL MU scheduling frame described with reference to FIGS. 4 and 5 to the plurality of STAs based on the received BSR. Although the AP transmits the UL MU scheduling frame to all STA 1 to STA n in consideration of the BSR in FIG. 6, the AP may transmit the UL MU scheduling frame to some STAs.

Based on the UL MU scheduling information, the STAs may transmit the UL MU frames at a given time and receive the ACK signal from the AP.

In an MU TXOP procedure, a network allocation vector (NAV) for MU TXOP may be configured according to the duration information of each frame. At this time, when the DL MU frame is transmitted using a conventional method, the NAV is used to protect transmission of a DL MU frame and reception of an ACK frame therefor. In contrast, in the present embodiment, if the BSR is transmitted along with the ACK frame and the AP transmits the UL MU scheduling frame in consideration of the BSR, up to the UL MU scheduling frame transmission time may be regarded as the duration to extend a TXOP period.

In the embodiment of FIG. 6, each frame in the TXOP may be transmitted based on a specific time (e.g., SIFS).

Figure 7:
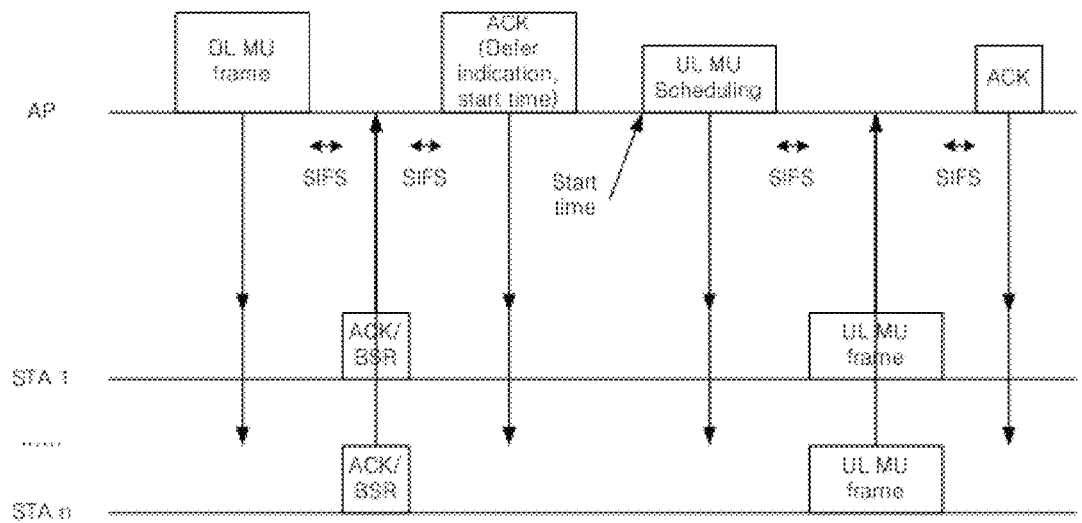
FIG. 7 is a diagram illustrating the case where an AP defers and transmits a UL MU scheduling frame to a plurality of STAs according to another embodiment of the present invention.

FIG. 7 is a diagram illustrating the case where an AP defers and transmits a UL MU scheduling frame to a plurality of STAs according to another embodiment of the present invention.

The operation for, at the AP, transmitting a DL MU frame and receiving a BSR from each STA along with an ACK signal in FIG. 7 is equal to that of FIG. 6. The present embodiment relates to the case where the AP, which has received the BSR, cannot immediately transmit the UL MU scheduling frame. In this case, as shown in FIG. 7, the AP transmits a UL scheduling defer transmission indicator along with a response frame (e.g., ACK frame) to transmission of the BSR of each STA.

Here, the UL scheduling defer transmission indicator indicates that the AP will transmit a UL MU scheduling frame later. In this case, the response (e.g., ACK) frame transmitted by the AP may be transmitted in a state of including transmission start time information indicating when the AP transmits the UL MU scheduling frame in the above-described delay indicator. If the UL MU scheduling frame transmission start time information is not included, the STAs may not receive the UL MU scheduling frame even after the predetermined time and thus may switch to SU operation. In this case, a transmission procedure may become complicated as compared to UL MU operation.

For example, the STAs, which have received a frame having a delay transmission indicator set to 1, may know that the UL scheduling frame is received later. In addition, if the UL MU scheduling start time (or wakeup time) information is included, the STAs may enter a doze state until the start time, thereby reducing power consumption.

Figure 8:
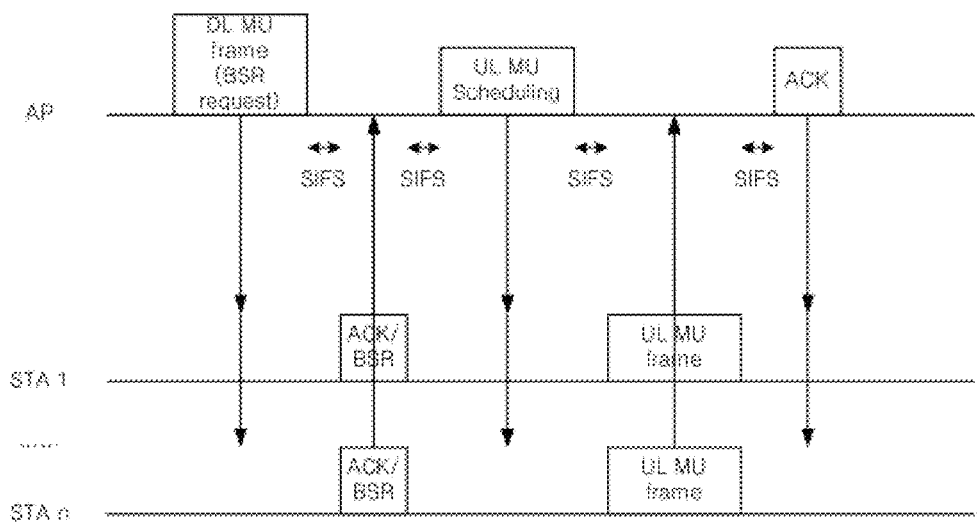
FIGS. 8 and 9 are diagrams illustrating the case where a signal for requesting BSR transmission is included in a DL MU frame transmitted by an AP according to anther embodiment of the present invention.
Figure 9:
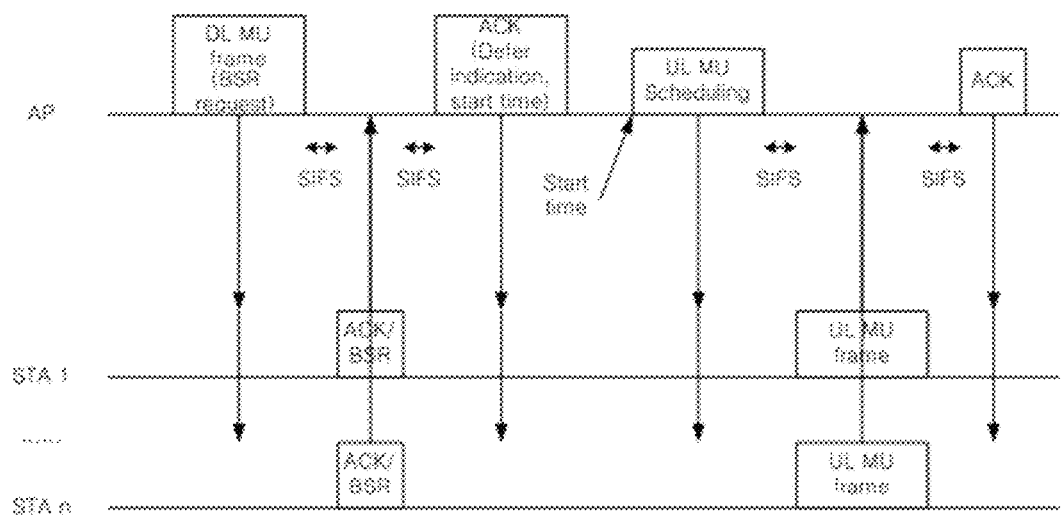

FIGS. 8 and 9 are diagrams illustrating the case where a signal for requesting BSR transmission is included in a DL MU frame transmitted by an AP according to anther embodiment of the present invention.

The embodiments shown in FIGS. 8 and 9 are different from the embodiments of FIGS. 6 and 7 in that the DL MU frame transmitted by the AP further includes a signal BSR-REQ for requesting the BSR from each STA. Here, in the BSR request signal, the BSR is included in a subsequent ACK frame, thereby indicating that the BSR is included in one frame. For example, a specific value of ACK policy may indicate ACK transmitted along with the BSR.

If a BSR request field value is set to 1, the STA, which has received such a BSR request signal, may transmit ACK/BA along with a BSR and, otherwise (BSR-REQ=0), transmit an ACK/BA frame without a BSR.

Although the signal BSR-REQ for requesting the BSR from each STA is included and transmitted in the DL MU frame in FIGS. 8 and 9, the BSR-REQ may be transmitted to the STAs independently of the DL MU frame in another embodiment of the present invention.

That is, the AP may transmit the BSR-REQ for requesting the BSR from each STA in the form of a UL MU scheduling frame and enable each STA to transmit the BSR. The AP may immediately transmit the UL MU scheduling frame including scheduling information for UL MU frame transmission after a predetermined time (e.g., SIFS) similarly to FIG. 8 or may transmit the UL MU scheduling frame at a corresponding time after first transmitting a response frame including a defer indicator and transmission start time information of the UL MU scheduling frame similarly to FIG. 9.

Each STA may transmit the UL MU frame at a time allocated thereto and receive a response frame from the AP in response thereto.

Figure 10:
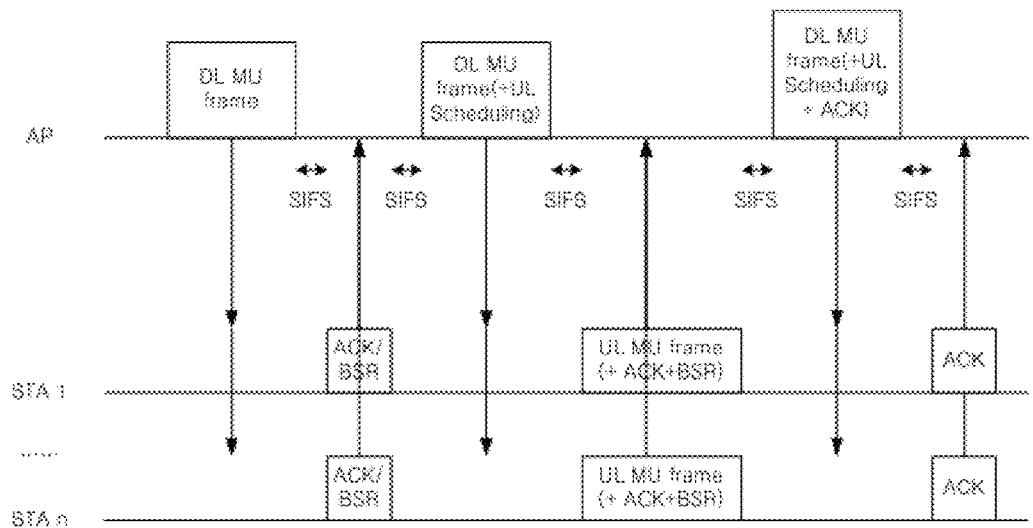
FIG. 10 is a diagram illustrating the case where a UL MU scheduling frame is piggybacked on a DL MU frame transmitted by an AP according to another embodiment of the present invention.

FIG. 10 is a diagram illustrating the case where a UL MU scheduling frame is piggybacked on a DL MU frame transmitted by an AP according to another embodiment of the present invention.

In the embodiment of FIG. 10, the process of, at the AP, transmitting a DL frame upon initial transmission and, at each STA, transmitting the ACK frame including the BSR in response thereto has been described above. However, in the present embodiment, the AP piggybacks the UL MU scheduling frame on the DL MU frame instead of separately transmitting the UL MU scheduling frame.

ACK transmitted by each STA may be piggybacked on the UL MU frame transmitted in response to the UL MU scheduling frame. As a further simplified example, a UL/DL frame received when an SIFS has elapsed after transmitting a DL/UL frame may be regarded as ACK for a transmitted frame.

In addition, the BSR transmitted by each STA for UL MU transmission may be piggybacked on and transmitted in the UL MU frame.

Figure 11:
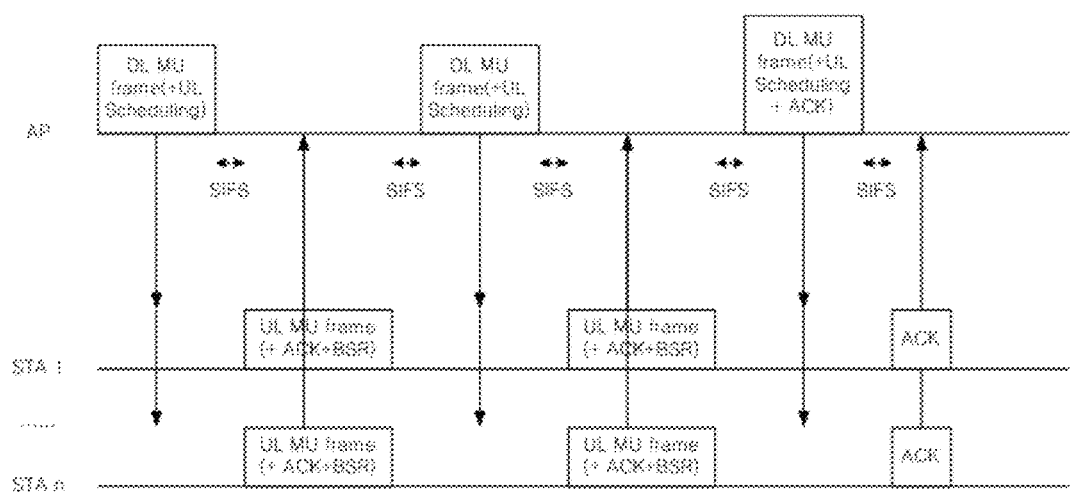
FIG. 11 is a diagram illustrating the case where a UL MU scheduling frame is piggybacked on a DL MU frame initially transmitted by an AP according to another embodiment of the present invention.

FIG. 11 is a diagram illustrating the case where a UL MU scheduling frame is piggybacked on a DL MU frame initially transmitted by an AP according to another embodiment of the present invention.

That is, in FIG. 11, UL scheduling information may be included in a DL MU frame initially transmitted by the AP, in addition to the embodiment of FIG. 10. If the BSR information of the STAs is conventionally stored, the UL scheduling information determined using the same may be transmitted.

Figure 12:
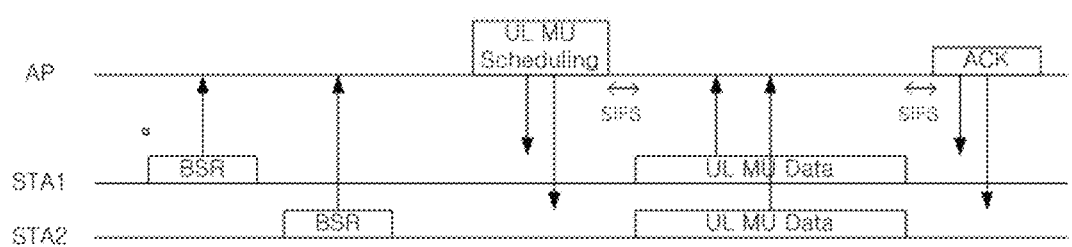
FIG. 12 is a diagram illustrating another aspect of the present invention in UL MU Tx.

FIG. 12 is a diagram illustrating another aspect of the present invention in UL MU Tx.

As shown in FIG. 12, for UL MU Tx, each STA may transmit the BSR and the AP may transmit the UL MU scheduling frame in response thereto. According to the above-described operation mechanism, the STAs, which have received the UL MU scheduling frame, may transmit the UL MU data frame using given resources after the predetermined time SIFS if the ID thereof is included in the UL MU scheduling frame.

In some instances, some of the STAs, which have received the UL MU scheduling frame, may not immediately transmit the UL MU data after the predetermined time SIFS due to long processing delay. In the following description, an operation configuration for solving the above-described problems will be described.

Figure 13:
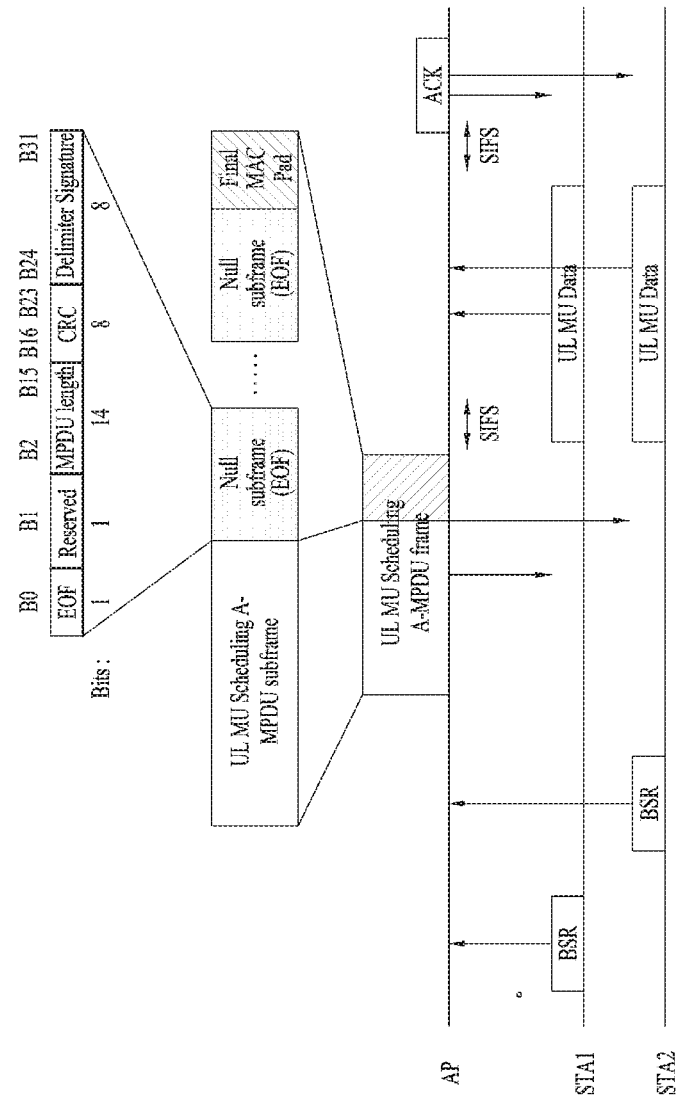
FIG. 13 is a diagram illustrating a method including one or more meaningless subframes in a UL MU scheduling A-MPDU frame transmitted by an AP according to an embodiment of the present invention.

FIG. 13 is a diagram illustrating a method including one or more meaningless subframes in a UL MU scheduling A-MPDU frame transmitted by an AP according to an embodiment of the present invention.

More specifically, in FIG. 13, a structure in which a plurality of null subframes is included in the rear part of a UL MU scheduling A-MPDU frame is shown. How many null subframes are included by the AP may be changed according to implementation. By adding the null subframes to the rear part of the UL MU scheduling frame, the STAs may prevent the problem that the UL MU frame is not transmitted after the UL MU scheduling frame due to processing delay. That is, the STAs, which have received the UL MU scheduling frame, may be configured to omit decoding at the locations of the null subframes and to perform processing of scheduling information received at the corresponding frame.

In addition to the above-described null subframes, other subframes used for other purposes may be used.

Figure 14:
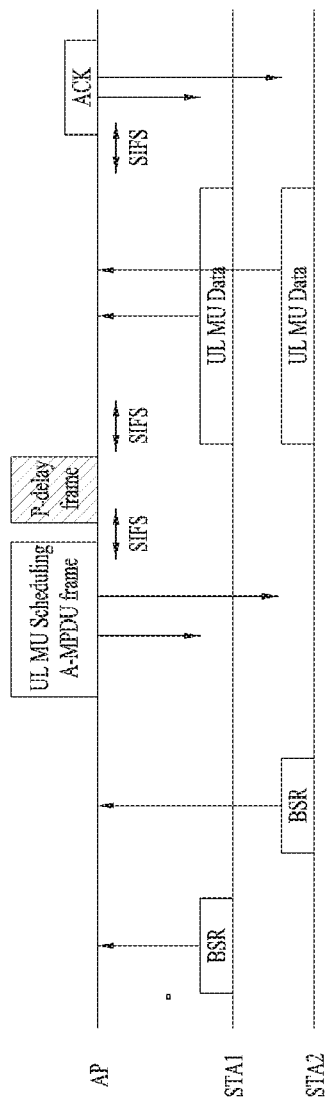
FIG. 14 is a diagram illustrating a method of transmitting a P-delay frame after an AP transmits a UL MU scheduling A-MPDU frame according to another embodiment of the present invention.

FIG. 14 is a diagram illustrating a method of transmitting a P-delay frame after an AP transmits a UL MU scheduling A-MPDU frame according to another embodiment of the present invention.

More specifically, in FIG. 14, the AP, which has received the UL MU scheduling frame, may be configured to transmit a P-delay frame after a time SIFS and to receive a UL MU data frame from the STAs after the time SIFS has elapsed therefrom.

FIGS. 15 to 18 are diagrams showing various forms of a P-delay frame.

Figure 15:
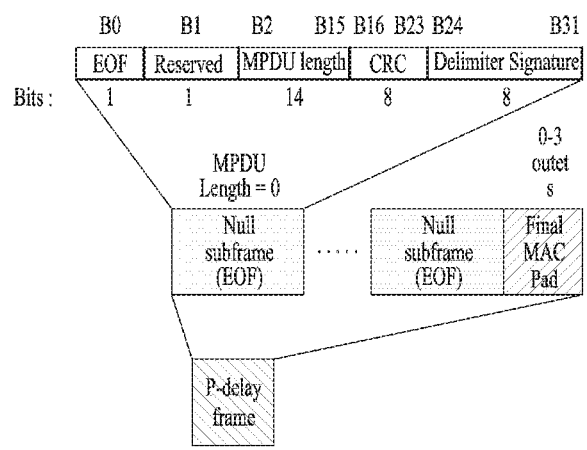
FIGS. 15 to 18 are diagrams showing various forms of a P-delay frame.

More specifically, as shown in FIG. 15, the P-delay frame may include one or more meaningless A-MPDU subframes (e.g., null frames) and, more preferably, one null subframe.

Figure 16:
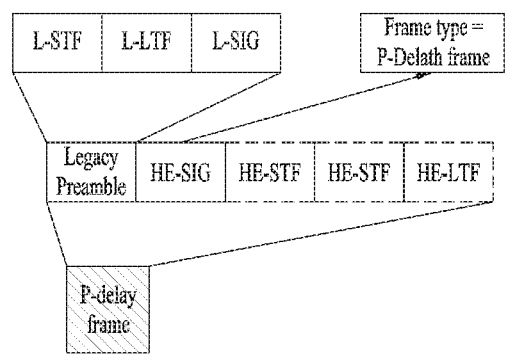

As shown in FIG. 16, the P-delay frame may have an NDP frame format. In this case, a specific field (e.g., frame type field) in an SIG of the NDP may indicate that the frame is a P-delay frame.

Figure 17:
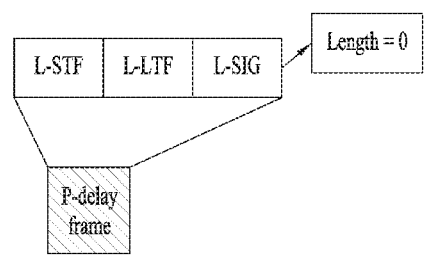
Figure 18:
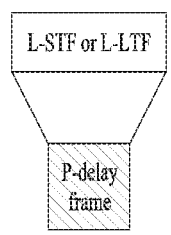

As shown in FIGS. 17 and 18, the P-delay frame may include all or some of the L-part fields. The length of L-SIG may be set to 0 as shown in FIG. 17.

On such an assumption, the STAs, which have received the UL MU scheduling frame, may be configured to omit decoding of the P-delay A-MPDU frame based on the L-SIG field and to transmit the UL MU frame when the SIFS elapses after receiving the P-delay frame.

Figure 19:
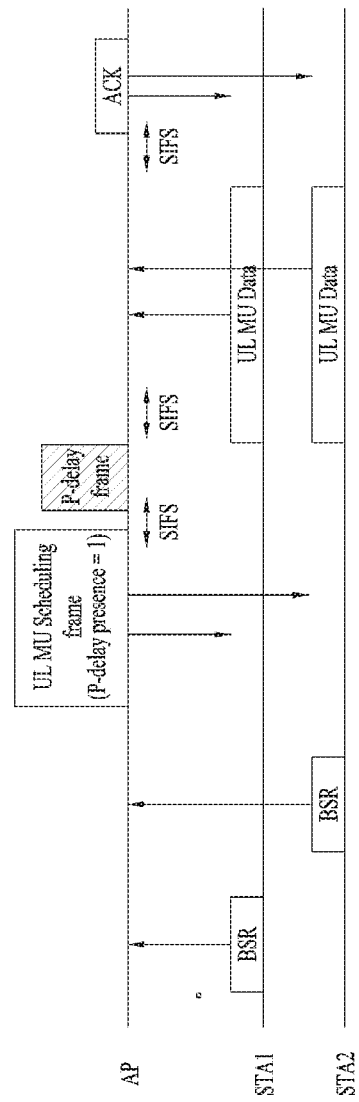
FIG. 19 is a diagram showing the case of using a P-delay frame according to another embodiment of the present invention.

FIG. 19 is a diagram showing the case of using a P-delay frame according to another embodiment of the present invention.

The embodiment shown in FIG. 19 is equal to the embodiments described with reference to FIGS. 14 to 18 in that the time required for each STA to transmit the UL MU data frame is ensured using the P-delay frame. However, in the example of FIG. 19, an indicator indicating whether the P-delay frame is transmitted later in the UL MU scheduling frame transmitted by the AP is further included.

If such an indicator is used, when the P-delay frame indicator field of the UL MU scheduling frame is set to 1, the STAs may be configured to omit decoding of the P-delay frame and to transmit the UL MU frame when the SIFS elapses after receiving the P-delay frame.

In addition, when the P-delay frame indicator field of the UL MU scheduling frame is set to 0, the AP may not transmit the P-delay frame and each STA may be configured to transmit the UL MU data frame when the SIFS elapses after receiving the UL MU scheduling frame.

Figure 20:
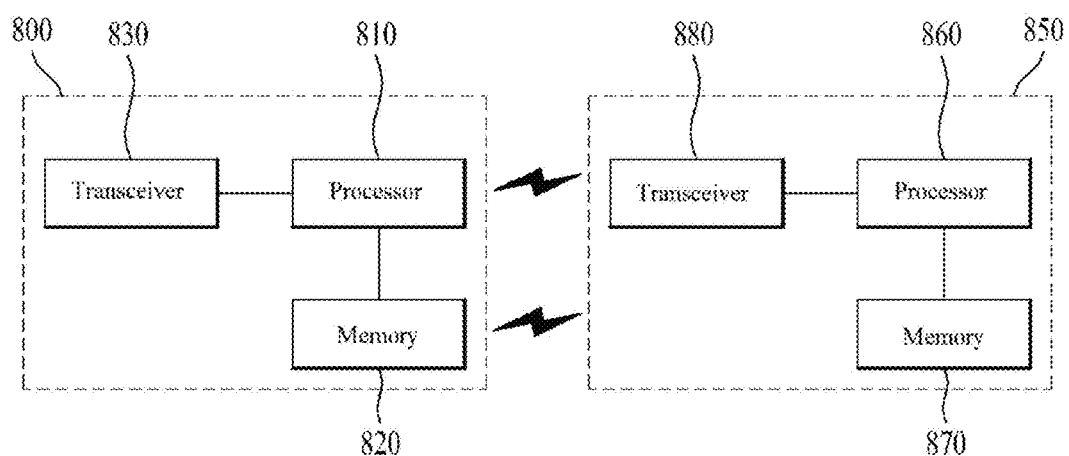
FIG. 20 is a diagram illustrating a device for implementing a method according to the present invention.

FIG. 20 is a diagram illustrating a device for implementing a method according to the present invention.

A wireless device 800 of FIG. 20 may correspond to the specific STA of the above description and a wireless device 850 may correspond to the AP of the above description.

The STA 800 may include a processor 810, a memory 820 and a transceiver 830 and the AP 850 may include a processor 860, a memory 870 and a transceiver 880. The transceivers 830 and 880 may transmit and receive a radio signal and may be executed at a physical layer of IEEE 802.11/3GPP. The processors 810 and 860 may be executed at the physical layer and/or MAC layer and are connected to the transceivers 830 and 880. The processors 810 and 860 may perform the above-described UL MU scheduling procedure.

The processors 810 and 860 and/or the transceivers 830 and 880 may include application-specific integrated circuits (ASICs), other chipsets, logic circuits and/or data processors. The memories 820 and 870 may include read-only memories (ROMs), random access memories (RAMs), flash memories, memory cards, storage media and/or other storage units. When one embodiment is implemented as software, the above-described method may be embodied as a module (e.g., process, function) for performing the above-described function. The module may be stored in the memories 820 and 870 and may be executed by the processors 810 and 860. The memories 820 and 870 may be disposed inside or outside the processors 810 and 860 and may be connected to the processors 810 and 860 by a well-known means.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

Although it is assumed that the present invention is applied to an IEEE 802.11 based wireless local area network (WLAN) system, the present invention is not limited thereto. The present invention is equally applicable to various wireless systems in which UL MU transmission between wireless devices such as device-to-device communication is necessary.

What is claimed is:

1. A method for a station (STA) to transmit uplink data in a wireless local area network (WLAN) system, the method comprising:
   receiving, from an access point (AP), a frame including uplink multi-user (UL MU) scheduling information for the uplink data transmission; and
   transmitting the uplink data to the AP based on the UL MU scheduling information,
   wherein the transmission of the uplink data is performed after a SIFS (Short Interframe Space),
   wherein a start timing of the SIFS is end of the frame,
   wherein the frame further includes a specific field including null information for extending a length of the frame to delay the start timing of the SIFS, and
   wherein the STA is provided with an additional time to prepare for the transmission of the uplink data based on the delay of the start timing of the SIFS.

2. The method of claim 1, wherein a length of the specific field is changed in consideration of a time required for the STA to process the UL MU scheduling information.

3. The method of claim 1, wherein the STA skips decoding of the specific field of the frame to earn a processing time for the UL MU scheduling information.

4. The method of claim 1, wherein the frame including the UL MU scheduling information is a trigger frame.

5. The method of claim 1, further comprising:
   transmitting a buffer status report (BSR) to the AP to assist the AP at determining the UL MU scheduling information.

6. The method of claim 1, further comprising:
   receiving acknowledgement information to the uplink data from the AP, wherein the acknowledgement information is received within an ACK frame after the transmission of the uplink data.

7. The method of claim 1, wherein the UL MU scheduling information includes:
   an ID field including identification information of the AP;
   STA ID fields for identifying each of multiple STAs of the UL MU transmission;
   resource allocation fields allocating uplink resources to each of the multiple STAs; and
   control fields for data transmission schemes used by each of the multiple STAs.

8. A method for an access point (AP) to receive uplink data from multiple stations (STAs) in a wireless local area network (WLAN) system, the method comprising:
   transmitting, to the multiple STAs, a frame including uplink multi-user (UL MU) scheduling information for a transmission of the uplink data; and
   receiving, from the multiple STAs, the uplink data based on the UL MU scheduling information,
   wherein the reception of the uplink data is performed after a SIFS (Short Interframe Space),
   wherein a start timing of the SIFS is end of the frame,
   wherein the frame includes a specific field including null information for extending a length of the frame to delay the start timing of the SIFS, and
   wherein the STA is provided with an additional time to prepare for the transmission of the uplink data based on the delay of the start timing of the SIFS.

9. A station (STA) for transmitting uplink data in a wireless local area network (WLAN) system, the STA comprising:

a transceiver configured to receive, from an access point (AP), a frame including uplink multi-user (UL MU) scheduling information for the uplink data transmission, and to transmit the uplink data to the AP based on the UL MU scheduling information; and a processor configured to control the transceiver such that the transmission of the uplink data to be performed after a SIFS (Short Interframe Space), wherein a start timing of the SIFS is end of the frame, wherein the frame further includes a specific field including null information for extending a length of the frame to delay the start timing of the SIFS, wherein the STA is provided with an additional time to prepare for the transmission of the uplink data based on the delay of the start timing of the SIFS.

10. An access point (AP) for receiving uplink data from multiple stations (STAs) in a wireless local area network (WLAN) system, the AP comprising:

a transceiver configured to transmit, to the multiple STAs, a frame including uplink multi-user (UL MU) scheduling information for a transmission of the uplink data, and to receive, from the multiple STAs, the uplink data based on the UL MU scheduling information; and a processor configured to control the transceiver such that the reception of the uplink data is performed after a SIFS (Short Interframe Space), wherein a start timing of the SIFS is end of the frame, wherein the frame includes a specific field including null information for extending a length of the frame to delay the start timing of the SIFS, and wherein the STA is provided with an additional time to prepare for the transmission of the uplink data based on the delay of the start timing of the SIFS.

* * * * *